United States Patent [19]
Chang et al.

[11] Patent Number: 6,167,279
[45] Date of Patent: Dec. 26, 2000

[54] METHOD AND SYSTEM FOR SUPPORTING PACS USING A GSM MOBILE SWITCHING CENTER

[75] Inventors: Li-Fung Chang, Holmdel; Edward Lipper, East Brunswick, both of N.J.; Pertti S. Lukander, La Jolla, Calif.; Anthony Robert Noerpel, Long Branch; Vijay Kerala Varma, Holmdel, both of N.J.

[73] Assignees: Telcordia Technologies, Inc.; Nokia Mobile Phones Ltd., both of Morristown, N.J.

[21] Appl. No.: 08/596,884

[22] Filed: Mar. 13, 1996

[51] Int. Cl.[7] .......................................... H04Q 7/20
[52] U.S. Cl. .................. 455/462; 455/426; 455/465; 455/560
[58] Field of Search ..................... 455/422, 426, 455/432, 433, 435, 445, 461–462, 465–466, 500, 67.1, 560–561, 410–411; 380/23

[56] References Cited

U.S. PATENT DOCUMENTS

| | | |
|---|---|---|
| 5,260,987 | 11/1993 | Mauger . |
| 5,329,573 | 7/1994 | Chang et al. . |
| 5,455,863 | 10/1995 | Brown et al. . |
| 5,469,496 | 11/1995 | Emery et al. . |
| 5,475,735 | 12/1995 | Williams et al. . |
| 5,508,707 | 4/1996 | LeBlanc et al. . |
| 5,600,705 | 2/1997 | Maenpaa ................................. 455/433 |
| 5,815,808 | 9/1998 | Valentine ................................ 455/422 |
| 5,878,343 | 3/1999 | Robert et al. ........................... 455/462 |

FOREIGN PATENT DOCUMENTS

| | | | |
|---|---|---|---|
| WO 95/01073 | 1/1995 | WIPO | ........................... 455/FOR 100 |
| WO95/33348 | 12/1995 | WIPO | ........................... 455/FOR 100 |

*Primary Examiner*—Doris H. To
*Attorney, Agent, or Firm*—Joseph Giordano

[57] ABSTRACT

A method for enabling the integration of the Personal Access Communications System (PACS) which supports low-tier radio, wireless communication devices with a GSM network used to support high-tier, cellular devices to allow connection of the PACS system to public switched telephone networks that do not have Advanced Intelligent Network capabilities. The functions of the conventional PACS Access Manager are redistributed among the various components of the PACS/GSM integrated system. Modifications to the PACS protocol to make it compatible with GSM protocol are detailed.

6 Claims, 5 Drawing Sheets

METHOD AND SYSTEM FOR SUPPORTING PACS USING A GSM MOBILE SWITCHING CENTER

FIELD OF THE INVENTION

This invention relates to personal wireless communication. More specifically, this invention relates to a method of supporting personal wireless communication services using the Personal Access Communications System (PACS) which is interfaced through a mobile switching center in a Global System for Mobile Communications (GSM) to the public switched telephone network (PSTN).

BACKGROUND OF THE INVENTION

Current cellular services are provided around a frequency band of 800 MHz. These systems are known as "high-tier" systems. "High-tier" refers to a system that is characterized by high base stations, high transmission power, and several miles of coverage, and which can support wireless subscribers (for example, cellular telephones) which are traveling at relatively high speed, such as approximately 30 to 40 miles per hours or more.

One such high-tier system is the Global System for Mobile Communication (GSM) which is deployed in many areas of the world including parts of North America, Europe and Asia. GSM supports the subscriber units in a service area by managing location and identification information for each subscriber unit, transmitting system information and incoming calls to subscriber units, and receiving transmissions from subscriber units. GSM also interfaces the subscriber units with the local public switched telephone network (PSTN).

A cellular base station in a GSM system is typically a large and expensive structure. A high-tier base station may be hundreds of feet high and service a ten mile radius. In addition to their size and expense, traditional cellular communications are frequently of very low voice quality (8 kilobytes/second to 13 kilobytes/second) compared to the voice quality of low-tier wireless access technologies (32 kilobytes/second) when the subscriber unit is used indoors.

Traditional high-tier cellular systems are further limited in the amount of traffic they can carry. When enough subscribers attempt to use the system at the same time, high-tier systems become congested and subscribers' calls are blocked. "Cell splitting" is a known method of increasing the capacity of high-tier systems, but when enough demand is experienced, cell splitting ceases to be effective.

In addition to these systems, "low-tier" radio standards have been developed for wireless communication. One such low-tier system is the Personal Access Communications System (PACS), a radio standard for wireless communication that operates in the 1850–1990 Mhz frequency band.

PACS has several advantages over the known high-tier systems, such as small and inexpensive base stations and a much lower transmission power requirement. The development of PACS is described in the following articles which are incorporated herein by reference: D. C. Cox, *Universal Digital Portable Radio Communications*, Proceedings of the IEEE, Vol. 75, Apr. 1987, pp. 436–477; D. C. Cox, *A Radio System Proposal for Widespread Low-Power Tetherless Communications*, IEEE Trans. on Comm., February 1991, pp. 324–335; V. K. Varma et al., *A Flexible Low-Delay TDMA Frame Structure*, IEEE ICC '91, Denver, Colo., Jun. 23–26, 1991; American National Standards Institute J-STD-014, *Personal Access Communication System Air Interface Standard*, 1995 (hereinafter "ANSI J-STD-014").

The advantages of PACS stem from the small size of the base stations used. Known as radio ports (RPs), these base stations service a relatively small area (path lengths up to a few kilometers). Being both small and relatively inexpensive, RPs can be widely deployed on utility poles, on buildings, in tunnels, indoors, and so forth, to provide more comprehensive support for wireless access services. Additionally, RPs have relatively small power needs compared to high tier base stations. An RP can be line or battery powered.

PACS also has operational advantages. Its narrow band transmission format creates a relatively large number of frequency channels in the 10 MHz sub-bands from which an RP can choose. This allows PACS to have higher frequency reuse factors which allows for more efficient utilization of the available radio frequency band. Additionally, because most of the circuitry is located in radio port controller units (RPCUs) that service a number of RPs, upgrading the system can be accomplished without visiting each RP.

PACS, however, is not without limitations. As noted, PACS is a low-tier system and can only support subscriber units that are moving at relatively low speeds. Because of the small service areas supported by each RP, subscriber units traveling in excess of 30 to 40 miles per hour will require frequent hand-off or handover from one RP or base station coverage area to another. This is one reason that PACS is most cost effective in areas with a high density of slow moving (for example, pedestrian) subscribers.

PACS was originally developed under the assumption that the radio port network would be interfaced with the public switched telephone network (PSTN), specifically, to an ISDN switch. To support PACS, a PSTN must perform mobility management functions which are similar to those performed by GSM. Specifically, a PACS-supporting PSTN must track the location within the service area of each subscriber unit and manage the routing of calls.

In order to support the above-mentioned wireless access mobility management functions using PACS, a PSTN with Advanced Intelligent Network (AIN) capabilities will be required. However, PSTNs in many areas, especially in developing nations, are not equipped with AIN capabilities. Therefore, an alternative architecture is desired which would allow the rapid deployment of PACS so as to provide wireless services in such areas.

As described in detail below, supporting PACS using a GSM system will provide this alternative architecture.

SUMMARY OF THE INVENTION

It is an object of the present invention to meet the above stated needs and others. More specifically, it is an object of the present invention to provide a method whereby a Personal Access Communications System (PACS) for wireless access can be interfaced into a Global System for Mobile Communications (GSM) network through or via a mobile switching center (MSC) to provide mobility management functions. It is a further object of this invention to provide alerting functions in a PACS/GSM integration and to modify the protocol of the PACS system to be compatible with GSM.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the stated and other objects of the present invention, as embodied and described below, the method of this invention may comprise the steps of:

providing a number of PACS radio ports controlled by a number of radio port controller units throughout a service area;

connecting said radio port controller units to a mobile switching center of a GSM network; and providing the PACS radio port controller units with protocols for authentication and registration of a subscriber unit, and protocols for handover and ciphering which are compatible with GSM protocol.

This invention will allow a service provider to provide service to PACS-compatible subscriber wherever GSM is deployed. Such a service provider will have to construct the PACS infrastructure and then use the present invention to interface with GSM and the local public switched telephone network (a non-AIN PSTN).

BRIEF DESCRIPTION OF THE DRAWINGS

The accompanying drawings, which are incorporated in and form a part of the specification, illustrate the method of the present invention and, together with the description, serve to explain the principles of the invention. In the drawings.

DETAILED DESCRIPTION OF THE PREFERRED EMBODIMENT

Using the drawings, the preferred embodiment of the present invention will now be explained.

PHYSICAL INTEGRATION OF PACS AND GSM

Figure 1:
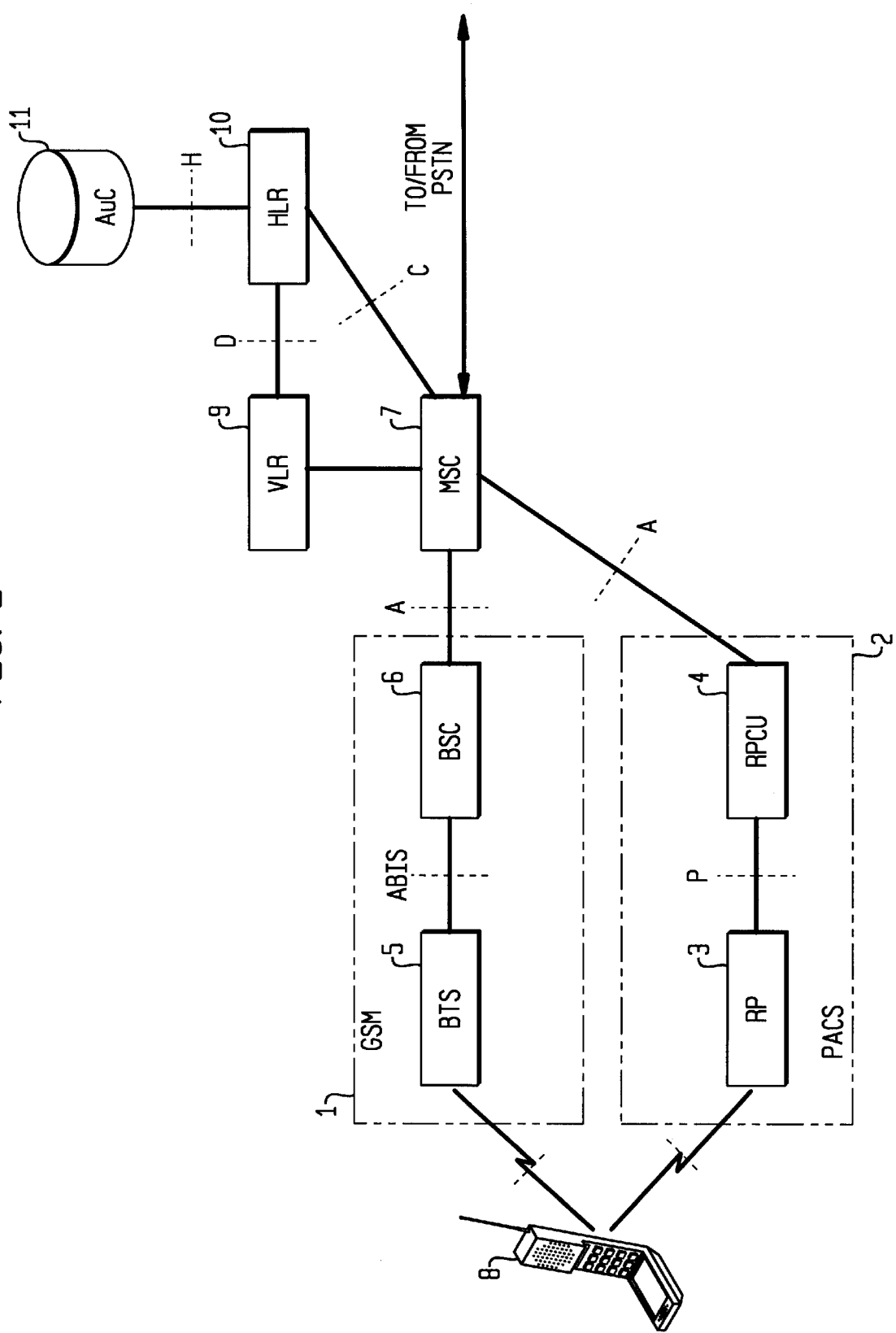
FIG. 1 is a block diagram showing a PACS infrastructure system interfaced with a GSM infrastructure in accordance with the method of the present invention.

FIG. 1 shows a GSM network 1 that has been integrated with and supports a PACS network 2. In this example, the basic components of the PACS network 2 are a radio port (RP) 3 and a radio port controller unit (RPCU) 4. The radio port 3 comprises a radio transmitter/receiver that communicates with subscriber units 8 through the air. While only one RP 3 and one RPCU 4 are shown, it will be understood that several may be provided.

PACS uses frequency division duplexing (FDD) to support two-way communication links. A related standard, PACS-UB, uses time division duplexing (TDD). Further details of the structure of PACS transmissions between subscriber units and RPs are described in the following articles incorporated herein by reference: L. F. Chang et al., *Combined Burst Synchronization and Error Detection Scheme for TDMA Portable Communication Systems*, IEEE Trans. Comm., 1991; J. Chuang, *Autonomous Adaptive Frequency Assignments of TDMA Portable Radio Systems*, IEEE Trans. Veh. Tech., Vol. 40, No. 3, pp. 627–635, August 1991; A. R. Noerpel et al., *PACS-UB, A Protocol for the Unlicensed Spectrum* IEEE ICC'95 Conf. Proceedings, Seattle, Wash. June, 1995.

The RPCU 4 is connected to the RP 3 through a P-interface. The signal used by the RPCU for managing the RP across the P-interface is separated logically from the call traffic in an embedded operations channel (EOC). Thus, the RPCU 4 controls the RP 3 and interfaces the RP 3 with the wireline network. Typically, a single RPCU controls a number of RPs. In a PACS system, several RPs and RPCUs are provided as needed throughout a service area. This deployment may include RPs placed indoors where traditional cellular devices are difficult to operate.

Conventionally, where a PSTN with AIN capabilities is available, an RPCU is connected to the PSTN via an ISDN connection. However, in the example shown in FIG. 1, the PACS system 2 is integrated with a GSM system 1 through the GSM mobile switching center (MSC) 7.

In the GSM system 1, a network of base stations (BTSs), represented by BTS 5, are each connected through an interface known as Abis to a base station controller (BSC) 6. While only one BSC is shown in FIG. 1, it will be understood that several may be provided. A subscriber unit 8 interfaces with a BTS 5 through a Um interface. The BTS 5 and the BSC 6 are analogous to the RP 3 and RPCU 4. Together, the BTS 5 and BSC 6 form a base station system (BSS).

The various BSSs of a GSM network are connected to a mobile switching center (MSC) 7 through an A-interface. The MSC 7 then interfaces the BSS network with the public switched telephone network (PSTN). In accordance with the present invention, such a PSTN does not need to have AIN capabilities because the MSC performs intelligent switching functions.

In the preferred embodiment of the invention, RPs 3 and RPCUs 4 are provided throughout an area served by GSM. The RPCUs 4 are connected, via the A-interface, to the MSC 7 of the GSM 1. This A-interface is the same type of interface that links the MSC 7 to the GSM base station systems 6.

The MSC 7 is also connected to a Visitor Location Register (VLR) 9 and a Home Location Register (HLR) 10. For each registration area where service is available, there is a VLR 9. When a subscriber initially requests service, identification and service profiles are created for that subscriber and are maintained in the HLR of the subscriber's home area. This identification is used to route incoming calls to the subscriber. Each HLR 10 is also connected to an authentication center (AuC) 11 which stores unique authentication information for verifying the identity of each subscriber unit 8.

If the subscriber unit roams into a different registration area, the subscriber unit would not be known to the system in the new area, and thus could not receive calls. As explained in greater detail below, this problem is resolved by a temporary registration of the subscriber unit with the local VLR.

When the subscriber unit finds itself in a new registration area, it registers with the local system by sending a message to the local VLR. The local VLR then contacts the HLR 10 in the subscriber's home area and receives the subscriber's identity information. The local VLR then assigns the subscriber unit a temporary identification for use while in the new registration area. The temporary identification is assigned for security, privacy, and other purposes.

When a call is made to the subscriber, the call is routed to the home area where the subscriber's HLR resides. If the subscriber is in the home registration area, the home system routes the call to the subscriber. If a remote VLR has contacted the HLR 10 to temporarily register the subscriber in another area, the home HLR 10 has the routing information of the subscriber's current location and the call is accordingly routed to the registration area where the subscriber unit is temporarily registered.

PROTOCOL INTEGRATION OF PACS AND GSM

Because PACS and GSM are quite different systems, the present invention incorporates several modifications to the operating procedures used by PACS to obtain compatibility with GSM. In creating a PACS/GSM integration, the present invention avoids making changes to the GSM equipment. Modifying the GSM equipment would involve great expense because GSM is already deployed in many areas and would have to be modified where and when it is in use. By changing the PACS protocol to make it compatible with GSM before the PACS equipment is deployed the need to modify GSM is eliminated. A preferred example for implementing this approach is described in detail below.

1) Authentication Algorithms

A subscriber unit must verify its identity with the system when receiving/initiating a call. This process is known as authentication. During authentication, a random number is given to the subscriber unit by the supporting system. The subscriber unit performs an unique algorithm on the random number to generate a different number. If the new number generated by the subscriber unit is verified by the system, the subscriber unit is authenticated.

In this example, the GSM-compatible subscriber unit is programmed with particular authentication algorithms, algorithms A3 and A8, that allow the unit to identify itself to the system. PACS-compatible subscriber units have similar algorithms, such as CAVE algorithms. To facilitate a PACS/GSM integration, the A3 and A8 algorithms are used by the subscriber unit in this embodiment of the invention instead of the CAVE algorithms. The security menu of the PACS-compatible subscriber unit is modified to include the coding for the A3 and A8 authentication algorithms.

In PACS, the system information channel (SIC) is constantly broadcasting a random number, called Rand, and the Real Time. A PACS-compatible subscriber unit can authenticate itself by taking the Rand and Real Time from the SIC broadcast, running the numbers through a CAVE algorithm and returning the result to the system for verification.

With reference to FIG. 1, when a GSM-compatible subscriber unit is being authenticated, three numbers (1) a 128-bit random challenge, and, (2) a session key, Kc, and (3) a signed response (SRES), are sent by the HLR 10 and AuC 11 in the subscriber's home area to the VLR 9 and MSC 7 where the unit is located. These three numbers are unique to each subscriber unit. The GSM system then transmits the RAND to the subscriber unit 8. The subscriber unit 8 then performs the A3/A8 algorithm to derive the SRES from the RAND. The subscriber unit then transmits the derived SRES to the local VLR 9. The local VLR 9 compares the derived SRES to the SRES sent from the HLR 10. If the SRES numbers match, the subscriber unit is authenticated.

Thus, in this example of an integration of PACS and GSM, the subscriber unit 8 is supplied with the A3 and A8 algorithms. However, as noted, the subscriber unit in a PACS system performs the authentication algorithm on a random number taken from the system information channel. In this embodiment, because no such random number is continuously broadcast in GSM, a PACS/GSM integrated subscriber unit 8 is equipped with new messages for requesting a random number, RAND, from the local VLR 9.

As shown in Table 1, in the preferred embodiment, the subscriber unit 8 is provided with an authentication request message (AUTH_REQ_C) to request the RAND. This message contains the following information elements; (1) Message Type, (2) Call Reference, (3) Security Menu Selection, (4) Location Updating Type, (5) Ciphering Key Sequence Number, (6) Location Area Identification, (7) Mobile Station Classmark, (8) SubID or TSubID=TMSI or IMSI, and (9) Initial Message Type (The initial message types for this information element are the call request message (CALL_REQ), terminal registration request message (TERM_REG_REQ) and the alert acknowledgement message (ALERT_ACK)).

Also in Table 1 are the types and lengths of each information element in the message. In all the tables herein, entries in the "reference" column refer to ANSI J-STD-014 and the "direction" column indicates the direction of communication between a subscriber unit ("SU") and an RPCU.

TABLE 1

Authentication Request Message (AUTH_REQ_C)

| Information Element | Reference | Direction | Type | Length |
|---|---|---|---|---|
| Message Type | 7.3.2.2 | SU→RPCU | M | 1 |
| Call Reference | 7.3.3.32 | SU→RPCU | M | 3 |
| Security Menu Selection | 7.3.3.21 | SU→RPCU | M | 3 |
| Location Updating Type | 7.3.3.x.1 | SU→RPCU | M | ½ |
| Ciphering Key Sequence Number | 7.3.3.x.2 | SU→RPCU | M | ½ |
| Location Area Identification | 7.3.3.x.3 | SU→RPCU | M | 5 |
| Mobile Station Classmark | 7.3.3.x.4 | SU→RPCU | M | 1 |
| SubID or TSubID = TMSI or IMSI | 7.3.3.x.5 | SU→RPCU | M | 2–9 |
| Initial Message Type (Note 1) | 7.3.3.26 | SU→RPCU | M | 3 |

Table 2 shows an authentication challenge message (AUTH_CHALLENGE) which the RPCU 4 uses to transmits the RAND to the subscriber unit. This message contains the following information elements: (1) Message Type, (2) Call Reference, (3) Ciphering Key Sequence Number, (4) Spare half-octet, and (5) GSM RAND.

TABLE 2

Authentication Challenge Message (AUTH CHALLENGE)

| Information Element | Reference | Direction | Type | Length |
|---|---|---|---|---|
| Message Type | 7.3.2.2 | RPCU→SU | M | 1 |
| Call Reference | 7.3.3.32 | RPCU→SU | M | 3 |
| Ciphering Key Sequence Number | 7.3.3.y.1 | RPCU→SU | M | ½ |
| Spare half-octet | 7.3.3.y.2 | RPCU→SU | M | ½ |
| GSM RAND | 7.3.3.y.3 | RPCU→SU | M | 16 |

Table 3 shows an authentication response message (AUTH_RESP) for transmitting the derived SRES to the RPCU 4 and VLR 9 for verification. This message contains the following information elements: (1) Message Type, (2) Call Reference, and (3) GSM SRES.

TABLE 3

Authentication Response Message (AUTH_RESP)

| Information Element | Reference | Direction | Type | Length |
|---|---|---|---|---|
| Message Type | 7.3.2.2 | SU→RPCU | M | 1 |
| Call Reference | 7.3.3.32 | SU→RPCU | M | 3 |
| GSM SRES | 7.3.3.y.4 | SU→RPCU | M | 4 |

2) Ciphering

Transmissions between a subscriber unit 8 and an RP 3 are encoded to protect the privacy of the subscriber. This encoding process is called ciphering. While both GSM and PACS use private key, stream ciphering methods for encryption of user information and signalling, there are differences in both the protocol/message flow and the information elements.

In the preferred embodiment, the GSM A5 ciphering algorithm is used for a PACS/GSM integrated system instead of the BRAID ciphering developed with PACS. The A5 algorithm can be used with PACS provided:

a) The public key ciphering option developed for PACS is not supported.

b) Only 88 bits of the 114 bit cipher which is available with the AS algorithm are used for enciphering and deciphering the PACS traffic and signalling channels.

c) The GSM key, Kc (64 bits) is used instead of the PACS key (88 bits) with a defined bit mapping.

d) The message requesting subscriber unit authentication (AUTH_REQ_C) no longer contains ciphered information elements.

e) Only the 22 least significant bits of the PACS frame count are used in the A5 algorithm and derived from the PACS radio channel. The ALT_COUNT information is ignored.

f) The rate of the A5 algorithm (228 cipher bits/4.615 ms; 449.4 kit/s) is adapted to the PACS rate (176 clear bits/2.5 ms; 70.4 kit/s).

3) Subscriber Identity

In GSM, when a subscriber initially registers for service, an international mobile subscriber identity (IMSI) is assigned to that subscriber. The same occurs in a PACS system, but the identification is structured differently and called the subscriber identity (SubID). To facilitate integration of the PACS and GSM systems, the IMSI is embedded in the PACS subscriber identity (SubID).

4) Temporary Subscriber Identity

In GSM, a temporary mobile subscriber identity (TMSI) is assigned to a subscriber each time the subscriber enters a new service area. Again, the same occurs in a PACS system, but the identification is structured differently and called the temporary subscriber identifier (TSubID). To facilitate integration of the PACS and GSM systems, the TMSI must be embedded in the PACS temporary subscriber identity (TSubID).

5) Equipment Identity

In GSM, each subscriber unit also has an international mobile equipment identity (IMEI). In PACS, an electronic serial number (ESN) is used. For the PACS/GSM integration, the IMEI is embedded in the ESN.

6) Port Identity

As described above, the PACS-compatible subscriber unit finds the RP providing the best signal and informs the network which RP it will use to access the system. To do this, the subscriber unit must be able to identify individual RPs and RPCUs to the system. In GSM each base station is identified by a cell global identifier (CGI). Thus, to facilitate integration of GSM and PACS each RP and RPCU is given a CGI to be used instead of the complete port identification (CPID) developed for use with PACS.

7) Location Area Identifier

In PACS, an area comprising a group of RPCUs serviced by the same VLR is identified by a complete registration area identifier. GSM uses a location area identifier (LAI). To integrate the two systems, the RPCU can translate the complete registration area identifier into a valid LAI for GSM.

Alternatively, in the preferred embodiment, the system information channel (SIC) used in PACS between the RP and the subscriber unit is modified to use the GSM LAI and other GSM codes. Specifically, the modification of the present example comprises adding the GSM information fields for the mobile country code (MCC), mobile network code (MNC), location area code (LAC) and cell identity (CI); and removing the PACS information fields for the complete registration area identification and RP identification. Also the Real Time field can be removed. In this embodiment, these modification are made to the RPCU, thus eliminating the need to modify the existing GSM protocol.

Figure 2:
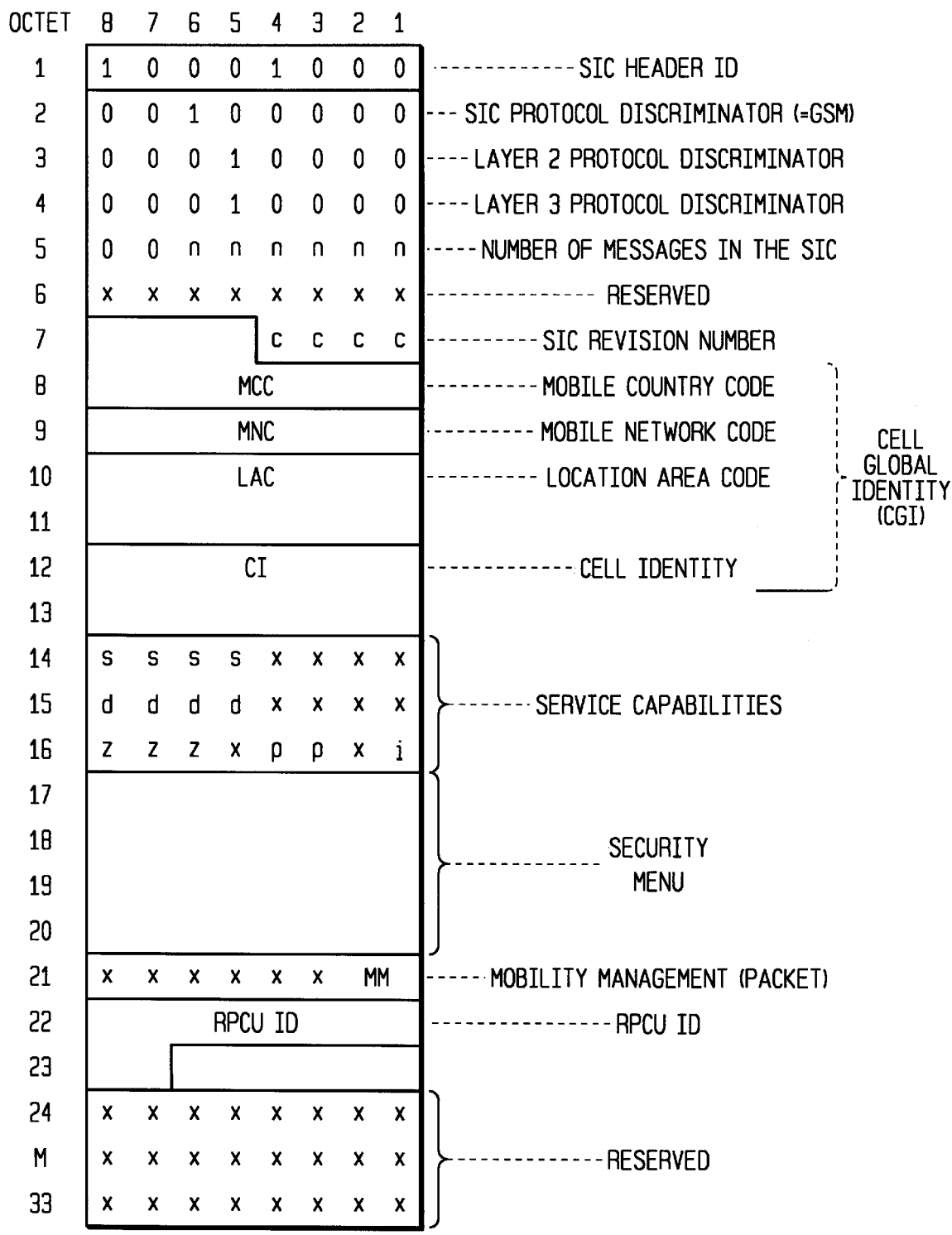
FIG. 2 is a diagram showing the contents of a system information channel that is broadcast in a GSM/PACS integrated system according to the present invention.

The modified format of the SIC is shown in FIG. 2. The first octet is the SIC header identification. The second octet is the SIC protocol discriminator (=GSM). The third and fourth octets are layer 2 and layer 3 protocol discriminators, respectively. The fifth octet indicates the number of messages in the SIC. The sixth octet is reserved. The seventh octet contains the SIC revision number and part of the mobile country code (MCC), the rest of which is in the eight octet. The ninth octet contains the mobile network code (MNC). The tenth and eleventh octets contain the location area code (LAC) and the twelfth and thirteenth octets contain the cell identity (CI). Together, the MCC, MNC, LAC and CI constitute the cell global identity (CGI).

Octets 14 through 16 contain the service capabilities. Octets 17 through 20 contain the security menu. Octet 21 is largely reserved, but does contain the mobility management packet (MM). Octets 22 and 23 contain the RPCU identification. The remaining octets are reserved.

8) Managing Subscriber Location and Identity

Addition ally, some of the function s necessary to the support of a PACS system as originally designed are carried out by a network element known as the access manager (AM) (not shown). The AM can reside in a service control point, a switch adjunct, or an intelligent peripheral. It can also be combined with an RPCU or stand alone. Generally, a single AM supports multiple RPCUs and takes care of network control tasks such as querying remote databases for visiting user information, setting up and delivering calls, and so forth.

More explicitly, the AM generates a temporary ALERT_ID for each subscriber unit within an area serviced by any RPCU 4 which is connected to the AM. When the user of a subscriber unit 8 receives a call or page, the AM matches the identification of the requested user with the temporary ALERT_ID for that user's subscriber unit 8. The AM then broadcasts an alert to the subscriber unit 8 and routes the call to the subscriber unit once the subscriber unit has been authenticated.

When PACS is interfaced with GSM, an AM will not necessarily be included in the integration since GSM does not include a separate access manager in its specification. In accordance the preferred embodiment of the present invention, the RPCU 4 takes over most of the AM's functions, including assigning ALERT_IDs. In doing so, the following two issues are addressed.

First, the ALERT_IDs within a service area should be unique to each subscriber unit 8. Otherwise, if each RPCU 4 within a service area is independently assigning ALERT_IDs to subscriber units 8, it is conceivable that two different subscriber units 8 will be assigned the same ALERT_ID by two different RPCUs 4. Second, the ALERT_ID of each subscriber unit should be known to all the RPCUs 4 in the service area so that the subscriber unit 8 does not have to remember multiple ALERT_IDs by which it may be paged.

An additional problem is raised by the fact that a GSM system 1 does not use ALERT_IDs at all. When paging a subscriber unit 8, GSM 1 sends a paging signal over the A-interface to the BSC 6. The paging signal may contain the international mobile subscriber identity (IMSI) of the user being paged, the temporary mobile subscriber identity (TMSI), a cell identifier list and the channel needed fields. The cell identifier list indicates in which areas the user is to be paged. After receiving the paging signal, the BSC 6 pages the user through the BTSs 5 connected to it. Therefore, in the PACS/GSM integrated system of the present invention, the RPCU 4 maintains a translation table equating TMSIs and IMSIs to the ALERT_ID it has generated for a given subscriber unit 8.

As noted above, an RPCU 4 will assign a new ALERT_ID to a registering subscriber unit. An identical identification may conceivably have already been assigned to a different subscriber unit 8 by a different RPCU serving an overlapping or near-by area. The unacceptable result is that a single ALERT_ID may page two different subscriber units.

On the other hand, while the new ALERT_ID may not conflict with another ALERT_ID, it is almost certainly a different ALERT_ID than was used by the previous RPCU to page the subscriber unit in question. Accordingly, the subscriber unit must remember multiple ALERT_IDs by which it may be paged.

In this example, this problem is addressed by re-registering the subscriber unit 8 when it moves into an area serviced by a new RPCU 4. This process will now be described in greater detail with reference to FIG. 3.

Initially, the subscriber unit 8 is at the location indicated by 12. The device registers with the system through the radio port, RP$_A$. RPCU$_1$ interfaces with the GSM via MSC$_1$. In a GSM network, TMSIs are assigned by the VLR 9 and correlated to IMSIs by communication between the VLR and the HLR 10 in the subscriber's home area.

During registration, the HLR 10 authenticates the identity of the subscriber unit and informs the VLR of the IMSI. The VLR 9 then assigns a TMSI and informs RPCU$_1$. RPCU$_1$ then assigns an ALERT_ID tied to that TMSI and informs the subscriber unit 8 of its ALERT_ID.

When the subscriber unit 8 moves to the location indicated by 13, it recognizes from the cell global identifier (CGI) in the system information channel (SIC) that RP$_B$, is serviced by the same RPCU as RP$_A$. Therefore, the subscriber unit does not need to re-register, but will continue to use the same ALERT_ID.

When the subscriber unit 8 moves to the location indicated by 14, it is served by a new RPCU 4, RPCU$_2$. Broadcasts on the SIC will tell the subscriber unit 8 that its present location is still serviced by the same VLR 9. However, because a new RPCU is involved, the subscriber unit performs a special registration, herein referred to as a fast registration, by sending a message (FAST_REG) to the new RPCU.

This message includes the following information elements: (1) Message Type, (2) TMSI (TSub_Id), (3) ALERT_ID, (4) Reserved, (5) Continuation Header, (6) CPID=CGI, and (7) Checksum. The type and length of the information elements of the FAST_REG message are detailed in Table 4 below.

TABLE 4

Fast Registration Message (FAST_REG)

| Information Element | Reference | Direction | Type | Length |
|---|---|---|---|---|
| Message Type | 6.9.3.1 | SU→RPCU | M | 1 |
| TMSI (TSub_Id) | 6.9.3 | SU→RPCU | M | 4 |
| ALERT_ID | 6.9.3.13 | SU→RPCU | M | 3 |
| Reserved | 6.9.3.9 | SU→RPCU | M | 2 |
| Continuation Header | 6.9.3.1 | SU→RPCU | M | 1 |
| CPID = CGI | 6.9.3.2 | SU→RPCU | M | 7 |
| Checksum | 6.9.3.7 | SU→RPCU | M | 2 |

As can be seen from the table, the subscriber unit, registers with the RPCU 4 by providing its TMSI and the ALERT_ID given it by the last RPCU. This avoids the need for the subscriber unit to store two ALERT_IDs, allowing it to store only the ALERT_ID given it by the present RPCU 4.

As may be noted, if the subscriber unit now stays in the area serviced by RPCU$_2$, RPCU$_1$, will be needlessly maintaining an ALERT_ID for the subscriber unit 8 which is out of its service area. This problem may be solved by a timer-based registration procedure built into the RPCUs 4 that cancels ALERT_IDs that have a timestamp older than 24 hours.

Upon receiving the fast registration message, RPCU$_2$ will assign the subscriber unit a new ALERT_ID and store the relationship between TMSI, IMSI and the new ALERT_ID. The RPCU responds to the subscriber unit 8 with the fast registration acknowledgement message (FAST_REG_ACK) detailed in Table 5. This message essentially informs the subscriber unit of its new ALERT_ID. The (FAST_REG_ACK) message contains the following information elements: (1) Message Type, (2) TMSI (TSub_Id), (3) ALERT_ID, and (4) Checksum.

TABLE 5

Fast Registration Acknowledgment Message (FAST_REG_ACK)

| Information Element | Reference | Direction | Type | Length |
|---|---|---|---|---|
| Message Type | 6.9.3.1 | RPCU→SU | M | 1 |
| TMSI (TSub_Id) | 6.9.3 | RPCU→SU | M | 4 |
| ALERT_ID (new) | 6.9.3.13 | RPCU→SU | M | 3 |
| Checksum | 6.9.3.7 | RPCU→SU | M | 2 |

Figure 3:
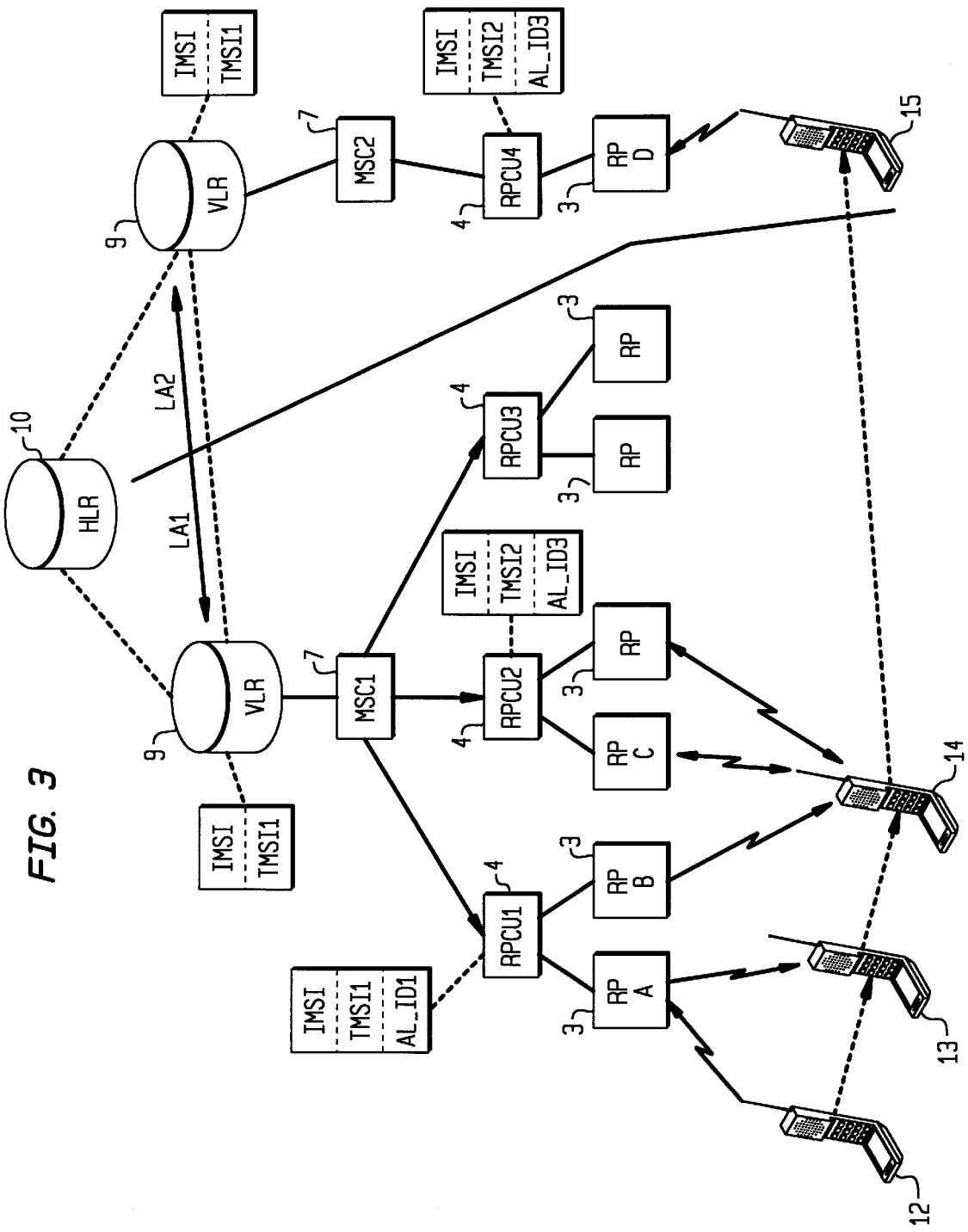
FIG. 3 is a block diagram showing an integrated GSM/PACS system that illustrates the subscriber unit location tracking method of the present invention.

Still with reference to FIG. 3, when the subscriber unit moves to the location indicated by 15, the CGI message on the SIC will inform the subscriber unit that it is in an area serviced by a different RPCU, RPCU$_4$, and by a different MSC 7 (MSC$_2$) and VLR 9. Accordingly, the subscriber unit will re-register using the protocol outlined above as well as the normal GSM registration process. The only difference is that the new VLR 9 will query the HLR 10 in the subscriber unit's home area for the subscriber unit's IMSI. The VLR 9 will then assign the subscriber unit 8 a new TMSI, matched to the IMSI, for the area indicated by LA$_2$ in FIG. 3.

Figure 4:
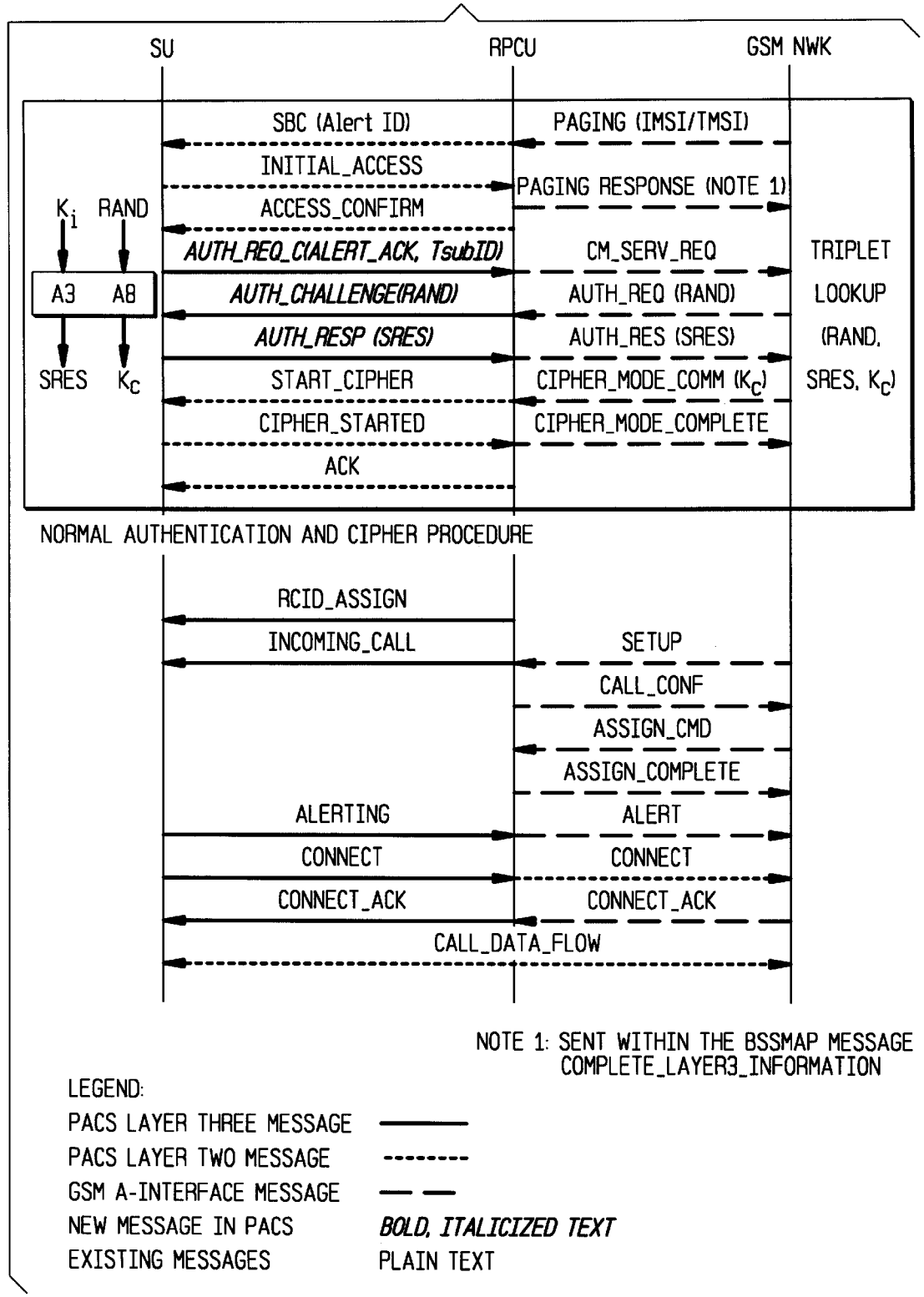
FIG. 4 is a schematic diagram showing the alerting protocol procedure of the present invention required to support authentication and call delivery in a GSM/PACS integrated system according to the present invention.

The message flow for alert and call delivery is shown in FIG. 4. In FIG. 4, solid lines indicate a PACS layer three message. Dotted lines indicate a PACS layer two message and dashed lines indicate a GSM A-Interface message. Bold and italicized messages are modifications to the PACS protocol to facilitate the PACS/GSM integration. Existing messages are shown in plain text.

As indicated, different functions that must be performed are conceptually grouped into layers. A layer is a functional plane of the communication system. The functions of a layer are carried out by a particular system component or components. For the preferred embodiment of the instant invention, the fast registration message and the acknowledgement are best placed in layer two which comprises the registration and authentication functions of the system.

The flow of messages shown in FIG. 4 is as follows. A GSM paging message (PAGING) is sent by the MSC to all the RPCUs serviced by that MSC. Any RPCU which has a record of the subscriber unit having been registered will broadcast the appropriate ALERT_ID (SBC (Alert ID)). After receiving the alert, the subscriber unit starts the authentication and cipher setup process. The authentication request message (AUTH_REQ_C) contains the alert acknowledgement message (ALERT_ACK) as the initial message type in order to inform the RPCU that the subscriber unit is answering the page. The authentication process then proceeds.

After authentication is completed and link encipherment is established, the RPCU sends a message assigning an identification for the call (RCID) to the subscriber unit. Next the GSM SETUP message is sent to the RPCU from the GSM network. The RPCU translates the message to a PACS incoming call message (INCOMING_CALL). The remainder of the call flow then involves a straightforward mapping of PACS messaging into GSM A-interface messaging which is performed by the RPCU.

9) Handover

As noted, when a subscriber unit is moving, the RP or base station providing the best signal may change. Thus, in addition to the possible need to re-register as described above, there must be a protocol for transferring an established link between the subscriber unit and one RP or base station to a different RP or base station when doing so will provide higher quality service for the subscriber. Switching a link is called a "handover." In PACS, handovers are also called automatic link transfers (ALTs).

In a PACS/GSM integrated system, if the handover is between two RPs that are controlled by the same RPCU, the existing PACS ALT protocol is sufficient. However, if the new RP is controlled by a different RPCU, the GSM MSC must perform the handover. Since there are significant differences between the PACS handover process and the GSM handover process, PACS protocol must again be modified.

In both PACS and GSM, the subscriber unit measures the signal strength of the existing link to the RP or base station being used and the strength of the signals transmitted by other nearby RPs or base stations that might be used.

In GSM, the network decides when to transfer the link to a different base station. The GSM subscriber unit transmits the results of its signal measurements to the base station every 0.5 seconds, where they are processed and compared. The base station controller then decides when a handover is needed and which new base station will receive the link. Thus, in GSM, the handover request originates from the old base station controller identifying the new base station controller.

In PACS, the subscriber unit decides when to transfer the link and which new RP to use. The PACS subscriber unit then signals the handover to the new RP directly. The advantage of this method is that the handover signaling takes place on the new link with the new RP and is therefore more reliable. Thus, to integrate PACS and GSM, new link transfer messages have to be introduced into the PACS protocol. The flow diagram for the new inter-RPCU PACS handover is described in FIG. 5, in which the same style and text conventions as FIG. 4 are utilized.

Figure 5:
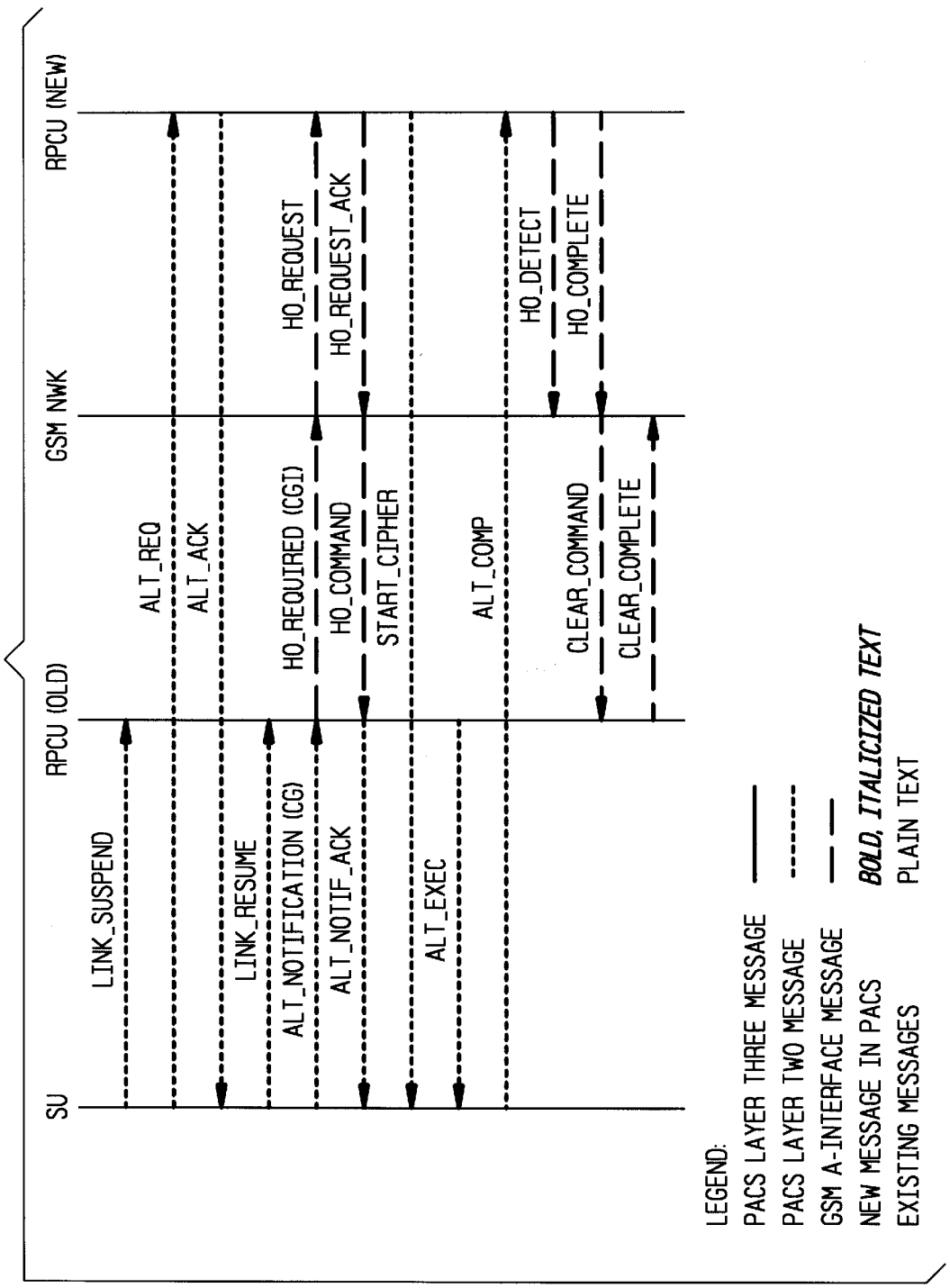
FIG. 5. is a schematic diagram showing the protocol procedure of the present invention required to support handovers in a GSM/PACS integrated system according to the present invention.

As shown in FIG. 5, when the subscriber unit decides a handover should be performed, it suspends the current call with the old RP (LINK_SUSPEND) and initializes a link with the new RP. The subscriber unit then sends a automatic link transfer request message (ALT_REQ) to the new RP. The type and lengths of the information elements in this message are detailed in Table 6 below. The message contains the following information elements: (1) Message Type, (2) Cell Global Identifier (CGI) for the new RP (RP), (3) Reserved, (4) Message Continuation (ALT_REQ_CONT), (5) RCID, (6) Access Information, (7) Reserved, and 8) Checksum.

TABLE 6

Automatic Link Transfer Request Message (ALT_REQ)

| Information Element | Reference | Direction | Type | Length |
|---|---|---|---|---|
| Message Type | 6.9.3.1 | SU→RPCU | M | 1 |
| CGI (new RP) | 6.9.3.16 | SU→RPCU | M | 7 |
| Reserved | 6.9.3.9 | SU→RPCU | M | 2 |
| Message Continuation (ALT_REQ_CONT) | 6.9.3.1 | SU→RPCU | M | 1 |
| RCID | 6.9.3.14 | SU→RPCU | M | 3 |
| Access Information | 6.9.3.12 | SU→RPCU | M | 1 |
| Reserved | 6.9.3.9 | SU→RPCU | M | 3 |
| Checksum | 6.9.3.7 | SU→RPCU | M | 2 |

Still referring to FIG. 5, if the new RPCU can accept the link transfer it responds to the subscriber unit with an automatic link transfer acknowledgement message (ALT_ACK). The ALT_ACK message contains a new information element called the handover reference (HO-reference). The HO-reference information element is used in GSM to identify the link during the handover. The ALT_ACK message is detailed in Table 7 below and contains the following information elements: (1) Message Type, (2) Time Slot, (3) RCID, (4) HO-Reference, (5) Reserved, and (6) Checksum.

TABLE 7

Automatic Link Transfer Acknowledgement Message (ALT_ACK)

| Information Element | Reference | Direction | Type | Length |
|---|---|---|---|---|
| Message Type | 6.9.3.1 | RPCU→SU | M | 1 |
| Time Slot | 6.9.3.5 | RPCU→SU | M | 1 |
| RCID | 6.9.3.2 | RPCU→SU | M | 3 |
| HO-Reference | 6.9.3.x | RPCU→SU | M | 1 |
| Reserved | 6.9.3.9 | RPCU→SU | M | 2 |
| Checksum | 6.9.3.7 | RPCU→SU | M | 2 |

GSM is informed where to transfer the link. In the preferred embodiment of the present invention, two new messages are added to the PACS layer two protocol. In FIG. 5, when the subscriber unit receives the automatic link transfer acknowledgement from the new RP that will accept the new link, the subscriber unit then resumes the link with the old RPCU (LINK_RESUME) and sends an automatic link transfer notification message (ALT_NOTIFICATION) that gives the identity of the new RPCU to the old RPCU. This message is detailed in Table 8 and contains the following information elements: (1) Message Type, (2) CGI, and (3) Checksum.

TABLE 8

Automatic Link Transfer Notification Message (ALT_NOTIFICATION)

| Information Element | Reference | Direction | Type | Length |
|---|---|---|---|---|
| Message Type | 6.9.3.1 | SU→RPCU | M | 1 |
| CGI | 6.9.3.z | SU→RPCU | M | 7 |
| Checksum | 6.9.3.7 | SU→RPCU | M | 2 |

The old RPCU then responds to the subscriber unit with an automatic link transfer notification acknowledgement message (ALT_NOTIF_ACK) which is detailed in table 9 below. The old RPCU then signals GSM to change the link with the subscriber unit to the new RPCU and identifies the new RPCU to GSM. The ALT_NOTIF_ACK message contains the following information elements: (1) Message Type, (2) RCID, (3) Reserved, and (4) Checksum.

TABLE 9

Automatic Link Transfer Notification Acknowledgment Message (ALT_NOTIF_ACK)

| Information Element | Reference | Direction | Type | Length |
|---|---|---|---|---|
| Message Type | 6.9.3.1 | RPSU→SU | M | 1 |
| RCID | 6.9.3.2 | RPCU→SU | M | 3 |
| Reserved | 6.9.3.9 | RPCU→SU | M | 4 |
| Checksum | 6.9.3.7 | RPCU→SU | M | 2 |

In FIG. 5, after the subscriber unit, has started the ciphering process over the new link, it sends a standard PACS automatic link transfer completed message (ALT_COMP) to the old radio control port. When the old radio control port receives this standard PACS message, it clears the old link to the subscriber unit. (CLEAR_COMMAND, CLEAR_COMPLETE).

10) Temporary Identification Reallocation

In GSM, the TMSI assigned to a subscriber unit is periodically changed to help preserve the confidentiality of subscriber identities. This TMSI reallocation procedure can be performed either implicitly during a location update or registration, or it can be explicitly initiated at any time during which the subscriber unit is communicating with the MSC and VLR. There is no procedure in PACS which corresponds to the explicit TMSI reallocation process.

There are several ways to solve this incompatibility. The simplest way is to abandon the TMSI reallocation process for an area served by a particular MSC if there are PACS RPCUs connected. The second and most complete alternative is to introduce a new message pair to the PACS subscriber unit protocol in layer 3 that performs the GSM TMSI reallocation procedure.

The third alternative is to use a message already existing in PACS which assigns an identification to an incoming radio call (RCID_ASSIGN) for the purpose of reallocating the PACS TSubID which would then be equated by the RPCU to the reallocated TMSI.

The problem with this alternative is that there is no acknowledgement to the RCID_ASSIGN message in the PACS protocol and the GSM MSC expects an acknowledgement when changing a subscriber unit's TMSI. There are three possibilities for overcoming this problem. First, the RPCU could send the acknowledgement message that GSM is expecting without getting an acknowledgement from the subscriber unit. Second, no acknowledgement is sent and the MSC goes through the connection failure part of its protocol. Third, a message acknowledging the changed temporary identification could be written for the subscriber unit to acknowledge the change.

11. De-registration

GSM has a procedure called IMSI Attach/Detach that subscriber units are required to support but that is optional for GSM networks to support. This procedure allows subscriber units to de-register from the network when they are powered down or turned off so that the network does not have to page powered down subscriber units. PACS supports a de-registration procedure that can be simply mapped into the GSM attach/detach procedure by the RPCU.

CONCLUSION

A detailed description of a preferred embodiment of the present invention has now been described in fulfillment of the objects set forth above. The advantages provided by the invention will be readily appreciated by those skilled in the art, as will be many modification and alternative embodiments which fall within the scope and spirit of the present invention.

For example, it is apparent that a subscriber unit may be designed to operate with the PACS system exclusively. Alternatively, the ability to communicate using PACS or a high-tier system, such as GSM, can easily be built into standard subscriber units with little increase in size or cost. The details of such an integration are further explored in the following article which is incorporated herein by reference: R Malkemes et al., *An Interoperable PACS and DCS 1900 Subscriber Unit Radio Architecture*, The Sixth IEE International Symposium on Personal, Indoor and Mobile Radio Communications (PIMRC'95), Sept. 27–29, 1995, Toronto, Canada.

Thus, if a subscriber has a subscriber unit that can make use of either high- or low-tier supporting systems, the subscriber can use whichever tier will provide the highest quality service under the circumstances. For example:

1) A subscriber who is indoors may use the improved signal quality of a nearby PACS RP rather than a high-tier service that has lower quality indoors;

2) A subscriber may switch to low-tier service if the high-tier service is saturated with other subscribers;

3) A subscriber may use the high-tier service if in a car or other vehicle traveling over 40 miles per hour.

The above description has been presented only to illustrate and describe the invention. It is not intended to be exhaustive or to limit the invention to the precise form disclosed. Many modifications and variations are possible in light of the above teaching. It is intended that the scope of the invention be defined by the following claims.

What is claimed is:

1. A method for integrating a personal access communications system (PACS) network with a global system for mobile communications (GSM) network comprising the steps of:

providing a number of PACS radio ports controlled by a number of radio port controller units throughout a service area;

interfacing said radio port controller units with a mobile switching center of said GSM network; and providing the PACS radio port controller units with communication protocols which are compatible with GSM protocols, including modifying a system information channel used by PACS by removing a radio port identification and registration area identification fields, and adding a mobile country code, a mobile network code, location area code and cell identity fields that are used by GSM.

2. A method for integrating a personal access communication system (PACS) network with a global system for mobile communications (GSM) system comprising the steps of:

providing a number of PACS radio ports controlled by a number of radio port controller units throughout a service area;

interfacing said radio port controller units with a mobile switching center of a GSM network;

providing the PACS radio port controller units with communication protocols which are compatible with GSM protocols;

providing a message whereby said subscriber unit requests that GSM switch an existing link between the subscriber unit and GSM from being routed through one said radio port controller unit to another radio port controller unit determined by said subscriber unit; and providing a message whereby said subscriber unit indicates to GSM to which radio port controller unit to switch said link.

3. A system for integrating a personal access communications system (PACS) network with a global system for mobile communications (GSM) network comprising:

a plurality of PACS radio ports spread throughout a service area that support subscriber units and are controlled by a plurality of radio port controller units; and a mobile switching center of a GSM network interfaced with said radio port controller units;

wherein said PACS radio port controller units are provided with protocols compatible with GSM protocols; and wherein a system information channel used by said radio port controllers is modified by removing a radio port identification and registration area identification fields, and adding a mobile country code, mobile network codes, location area code and cell identity fields that are used by GSM.

4. A system integrating a personal access communications system (PACS) network with a global system for mobile communications (GSM) network comprising:

a plurality of PACS radio ports spread throughout a service area that support subscriber units and are controlled by a plurality of radio port controller units; and a mobile switching center of a GSM network interfaced with said radio port controller units;

wherein said PACS radio port controller units are provided with protocols compatible with GSM protocols;

wherein said subscriber unit requests that GSM switch an existing link between the subscriber unit and GSM from being routed through one said radio port controller unit to another radio port controller unit determined by said subscriber; and wherein said subscriber unit indicates to GSM to which radio port controller unit to switch said link.

5. A method for integrating a personal access communication system (PACS) network with a global system for mobile communication (GSM) network comprising the steps of:

providing a number of PACS radio ports controlled by a number of radio port controllers throughout a service area;

interfacing said radio port controllers directly with a mobile switching center of a GSM network;

providing the PACS radio port controller units with communication protocols that are compatible with GSM protocols;

Providing PACS subscriber units with signaling and authentication capabilities that are compatible with GSM protocols;

performing a special registration when a subscriber unit moves to a different radio port controller unit, but its present location is still serviced by the same visitor location register;

providing a message to acknowledge the registration; and assigning a new alert identification to the subscriber unit and the radio port controller unit maintaining a translation table which matches the alert identification with a subscriber unit temporary subscriber identity.

6. A method for integrating a personal access communication system (PACS) network with a global system for mobile communication (GSM) network comprising the steps of:

providing a number of PACS radio ports controlled by a number of radio port controller units throughout a service area;

interfacing said radio port controller units directly with a mobile switching center of a GSM network;

providing the PACS radio port controller units with communication protocols that are compatible with GSM protocols;

providing PACS subscriber units with signaling and authentication capabilities that are compatible with GSM protocols;

performing a special registration followed by a normal GSM registration; and obtaining a new alert identification and a new temporary identity when a subscriber unit moves to a different radio port controller unit serviced by a different visitor location register.

* * * * *